US010942548B2

(12) United States Patent
Renda et al.

(10) Patent No.: US 10,942,548 B2
(45) Date of Patent: Mar. 9, 2021

(54) METHOD FOR PORTING MICROPHONE THROUGH KEYBOARD

(71) Applicant: APPLE INC., Cupertino, CA (US)

(72) Inventors: Nicholas A. Renda, San Francisco, CA (US); David M. Rockford, Los Alamitos, CA (US); Jonathan L. Berk, Mountain View, CA (US); Chanjuan Feng, San Francisco, CA (US); Daniel K. Boothe, San Francisco, CA (US); Daniel D. Hershey, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/275,755

(22) Filed: Feb. 14, 2019

(65) Prior Publication Data
US 2020/0097053 A1    Mar. 26, 2020

Related U.S. Application Data

(60) Provisional application No. 62/735,311, filed on Sep. 24, 2018.

(51) Int. Cl.
| G06F 1/16 | (2006.01) |
| H04R 1/04 | (2006.01) |
| H04R 1/40 | (2006.01) |
| H04R 3/00 | (2006.01) |
| H04R 1/02 | (2006.01) |

(52) U.S. Cl.
CPC .......... *G06F 1/1684* (2013.01); *G06F 1/1616* (2013.01); *G06F 1/1635* (2013.01); *G06F 1/1637* (2013.01); *G06F 1/1662* (2013.01); *H04R 1/028* (2013.01); *H04R 1/04* (2013.01); *H04R 1/406* (2013.01); *H04R 3/005* (2013.01)

(58) Field of Classification Search
None
See application file for complete search history.

(56) References Cited

U.S. PATENT DOCUMENTS

| 7,230,825 B2 * | 6/2007 | Sawyer ................. G06F 1/1616 248/923 |
| 7,394,480 B2 * | 7/2008 | Song ................. H04M 1/72522 348/14.02 |
| 7,877,125 B2 * | 1/2011 | Takizawa ................ H04M 1/03 455/575.4 |

(Continued)

FOREIGN PATENT DOCUMENTS

JP        2010187311        8/2010

*Primary Examiner* — Anthony Q Edwards
*Assistant Examiner* — Rashen E Morrison
(74) *Attorney, Agent, or Firm* — Kilpatrick, Townsend and Stockton LLP

(57) ABSTRACT

A computing device includes one or more microphones that function seamlessly with other components within the computing device. In one embodiment, a microphone opening is disposed underneath a keyboard with a channel from the microphone to an opening between the keyboard webbing and a keycap of the keyboard. In another embodiment, two microphones can be spaced apart from a keyboard region of the device and a third microphone can be disposed underneath the keyboard region with an channel from the microphone to an opening between the keyboard webbing and a keycap of the keyboard.

16 Claims, 6 Drawing Sheets

(56) References Cited

U.S. PATENT DOCUMENTS

| | | | | |
|---|---|---|---|---|
| 8,155,364 B2* | 4/2012 | An | ................. | H04R 1/406 |
| | | | | 381/357 |
| 8,300,845 B2* | 10/2012 | Zurek | ................. | H04R 1/406 |
| | | | | 381/92 |
| 8,744,109 B2* | 6/2014 | Crooijmans | ........... | H04R 1/083 |
| | | | | 381/355 |
| 8,971,552 B2* | 3/2015 | Momose | ................. | H04R 3/00 |
| | | | | 381/122 |
| 9,215,518 B2* | 12/2015 | Lee | ................. | H04R 1/04 |
| 2007/0127759 A1* | 6/2007 | Zhang | ................. | H04R 1/342 |
| | | | | 381/338 |
| 2008/0069389 A1* | 3/2008 | Zhang | ................. | H04R 1/406 |
| | | | | 381/355 |
| 2009/0245564 A1* | 10/2009 | Mittleman | ............. | H04M 1/035 |
| | | | | 381/361 |
| 2011/0085675 A1 | 4/2011 | Wickstrom | | |
| 2011/0144984 A1* | 6/2011 | Konchitsky | ............ | H04R 1/406 |
| | | | | 704/226 |
| 2012/0051548 A1* | 3/2012 | Visser | ................. | G10L 21/0208 |
| | | | | 381/56 |
| 2013/0021503 A1 | 1/2013 | Zurek et al. | | |
| 2013/0329915 A1* | 12/2013 | Andre | ................. | H04R 1/222 |
| | | | | 381/122 |
| 2014/0112517 A1* | 4/2014 | Farahani | ................. | H04R 1/265 |
| | | | | 381/365 |
| 2017/0038855 A1* | 2/2017 | Morrison | ............. | G06F 3/0202 |

* cited by examiner

METHOD FOR PORTING MICROPHONE THROUGH KEYBOARD

CROSS-REFERENCES TO RELATED APPLICATIONS

This application claims priority to U.S. Provisional Patent Application Ser. No. 62/735,311, filed Sep. 24, 2018, entitled "Method for Porting Microphone through Keyboard," which is herein incorporated by reference in its entirety and for all purposes.

FIELD

The described embodiments relate generally to computing devices. More particularly, the present embodiments relate to forming a channel for a microphone underneath a keyboard for a computing device.

BACKGROUND

Many computing devices, such as laptop computers, include applications that enable video calling and/or virtual assistants that respond to voice commands. Such applications capture audio information from microphones installed inside an enclosure or case for the computing devices. Capturing audio information at a far field distance (e.g., greater than three meters) from the computing devices can be difficult and require multiple microphones to be arranged in certain configurations.

As computing devices become smaller, internal component density increases which can provide constraints on microphone placement making it challenging to provide a microphone implementation in such devices that yields strong audio performance at both near and far field distances. Additionally, the location of openings in a device enclosure or housing that enable microphones arranged in a specific configuration optimized for audio performance to receive audio signals generated from outside the device can detract from the aesthetic appearance of the device.

SUMMARY

Some embodiments of the disclosure pertain to a computing device that includes one or more microphones positioned within a housing of the device in an unobtrusive location that does not distract from the aesthetic appeal of the device. The computing device can include a keyboard in which individual keycaps are coupled to a circuit board and extend through keyboard apertures in the device housing. The microphone can be positioned directly below the keyboard beneath the circuit board. An audio channel can be formed from the microphone through an aperture in the circuit board and between one or more of the keycaps and an edge of a keyboard aperture enabling the microphone to detect sounds external to the computing device through the audio channel.

Some embodiments can include multiple microphones within a device housing in a manner that provides strong audio performance at both near and far field distances. For example, in some embodiments the computing device can include at least three microphones disposed in a triangular arrangement. A first and a second microphone can be configured and optimized to detect near field audio and can be disposed within the device housing in an area spaced apart from the keyboard. A third microphone can be configured and optimized for far field audio and positioned directly below the keyboard as described herein. While some embodiments are particularly useful for laptop and other computers, the embodiments described herein are not limited to any particular computing device and can be utilized in many different computing devices that include one or more microphones and a keyboard.

In some embodiments, a computing device can include a base portion with a keyboard. The keyboard can include a plurality of keycaps protruding out of a plurality of openings in a top surface of the base portion. A microphone support element having upper and lower surfaces can be disposed within the base portion and have an aperture formed between upper and lower surfaces. A microphone can also be disposed within the base portion beneath the keyboard. The microphone can be coupled to the lower surface of the microphone support element and aligned over the aperture, and one or more internal components disposed in the base portion can combine to form or define an audio channel extending from the microphone through the aperture of the microphone support element to a gap formed between a keycap in the plurality of keycaps and a sidewall surface of an opening in the plurality of openings in the top surface of the base portion.

In some embodiments a computing device can include a housing having a first exterior surface defining a plurality of openings and a second exterior surface opposite the first exterior surface. A keyboard can be coupled to the housing. The keyboard can include a keyboard substrate disposed within the housing and a plurality of keycaps attached to the keyboard substrate with each individual keycap protruding through and filling a majority of a respective opening in the plurality of openings. The keyboard substrate can include an aperture formed through the keyboard substrate and a first microphone can be disposed within the housing between the first and second exterior surfaces. The computing device can further include an audio channel that extends from the first microphone through the aperture and through a gap between one of the plurality of keycaps and its respective opening in the plurality of openings. The audio channel can be defined by one or more internal components of the computing device disposed within the housing. In some embodiments, the computing device can further include second and third microphones disposed within the housing in an area spaced apart from the keyboard.

In some additional embodiments, a computing device according to the disclosure includes a housing, a keyboard and at least three microphones. The housing can include a first exterior surface defining a plurality of openings spaced in one or more rows and a second exterior surface opposite the first exterior surface and a keyboard. The keyboard can include a keyboard circuit board disposed within the housing and having an aperture formed there through. The keyboard can further include a plurality of keycaps attached to the keyboard circuit board with at least one individual keycap in the plurality of keycaps protruding through and filling a majority of a respective opening in the plurality of openings. First and second microphones of the at least three microphones can be disposed within the housing in an area spaced apart from the keyboard, while a third microphone can disposed within the housing between the keyboard circuit board and the second exterior surface of the housing. An audio channel, defined by one or more internal components disposed in a base portion of the housing, can extend from the third microphone through the aperture and through a gap between the at least one individual keycap and its respective opening in the plurality of openings.

In some embodiments at least three microphones are included in the computing device. The three microphones can be arranged in a triangular pattern and be part of a three-microphone array. Additionally, in some embodiments that include three microphones, a microphone disposed beneath the keyboard is optimized to receive far field audio while the other two microphones are positioned adjacent to microphone openings in the housing that are spaced apart from the keyboard and optimized to receive near field audio.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use identical reference numbers, the elements are generally either identical or at least similar in function or purpose.

BRIEF DESCRIPTION OF THE DRAWINGS

The included drawings are for illustrative purposes and serve only to provide examples of possible structures and arrangements for the disclosed inventive apparatuses and methods for providing computing devices. These drawings in no way limit any changes in form and detail that may be made to the invention by one skilled in the art without departing from the spirit and scope of the invention. The embodiments will be readily understood by the following detailed description in conjunction with the accompanying drawings, wherein like reference numerals designate like structural elements, and in which.

DETAILED DESCRIPTION

Figure 1:
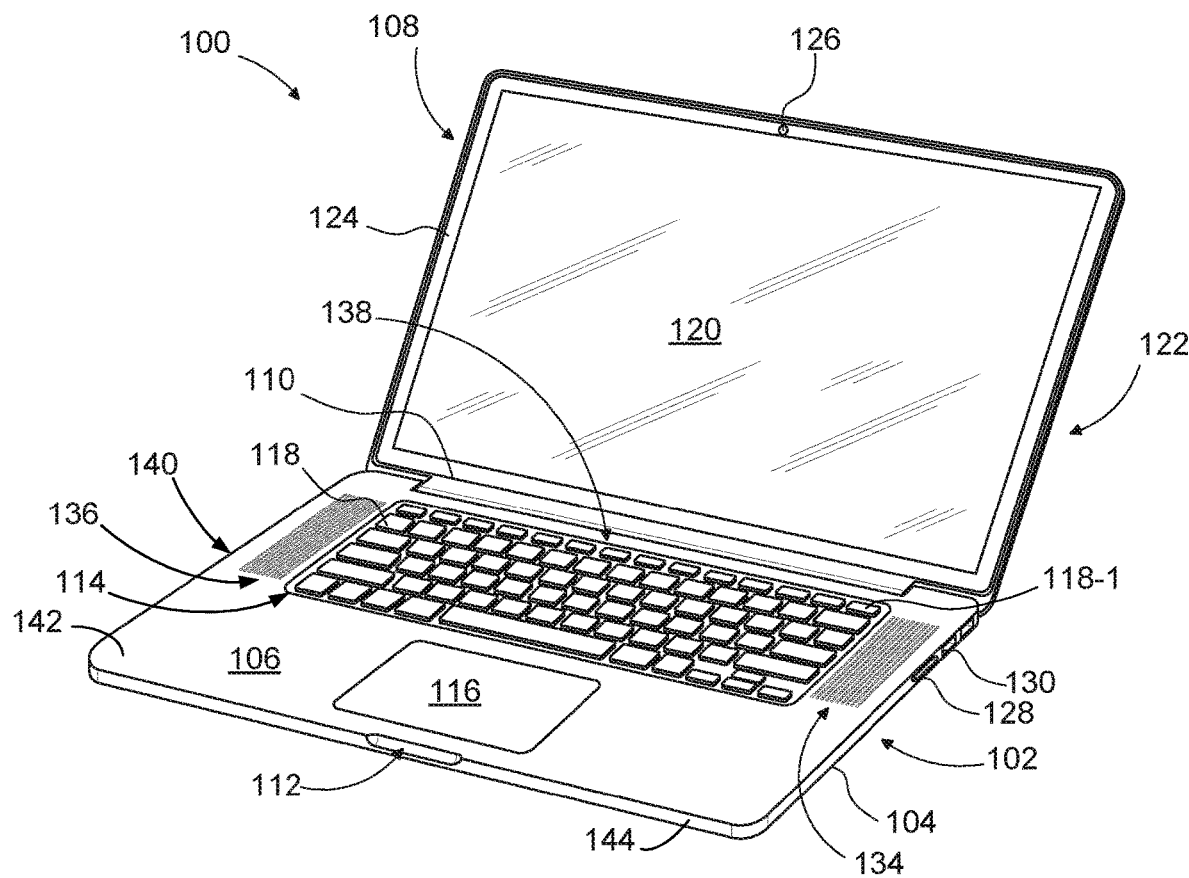
FIG. 1 shows a front facing perspective of an embodiment of a computing device according to the disclosure in the form of a computing device in an open (lid) state.

Embodiments of the disclosure pertain to a computing device such as a laptop computer, net book computer, tablet computer, desktop computer, or portable keyboard device, etc. that includes include a keyboard in which individual keycaps are coupled to a circuit board and extend through keyboard apertures in the device housing. The computing device can further include at least one microphone positioned within the housing directly below the keyboard and beneath the circuit board. An audio channel can be formed from the microphone through an aperture in the circuit board and between one or more of the keycaps and an edge of a keyboard aperture enabling the microphone to detect sounds external to the computing device through the audio channel while being positioned in an unobtrusive location that does not distract from the aesthetic appeal of the device. In some embodiments, the microphone is completely hidden from a user with no dedicated visible microphone opening that is common with many computing devices.

In some embodiments multiple microphones can be included within a device housing to provide strong audio performance at both near and far field distances. For example, in some embodiments a computing device can include at least three microphones disposed in a triangular arrangement. A first and second of the microphones can be configured and optimized to detect near field audio and can be disposed within the device housing in an area spaced apart from the device keyboard. A third microphone can be configured and optimized for far field audio and positioned directly below the keyboard as described herein.

In some embodiments a computing device can include a multipart housing having a top case and a bottom case joining at a reveal to form a base portion. The computing device can include an upper portion (or lid) that can house a display screen and other related components whereas the base portion can house various processors, memory, drives, ports, a battery, a keyboard, a touch pad and the like. The base portion can be formed of a multipart housing that can include top and bottom outer housing components each of which can be formed in a particular manner at an interface region such that the gap and offset between these outer housing components are not only reduced, but are also more consistent from device to device during the mass production of devices. These general subjects are set forth in greater detail below.

The base portion can also include one or more microphones to capture audio signals for recording or processing. Two or more microphones can be used together to determine an audio source direction that can be used to improve audio capture performance. In one embodiment, the spacing between two microphones can correspond to increasing sensitivity to audio signals centered about a selected frequency. In one embodiment, the selected frequency can be around 8 Kilohertz (KHz), which can be in a human voice range.

In one embodiment, an audio channel that enables a microphone to receive audio signals according to some embodiments of the disclosure can be located in the base portion in a gap between a keycap and a keyboard webbing. For example, some computing devices include a small gap surrounding each keycap of a keyboard to enable the keycap to extend out of the device housing and connect to a keyboard printed circuit board that is positioned within the housing. Some embodiments of the disclosure utilize this gap for a second purpose forming an audio channel between a microphone and the environment external to the computing device through the gap.

These and other embodiments are discussed below with reference to FIGS. 1-7. However, those skilled in the art will readily appreciate that the detailed description given herein with respect to these figures is for explanatory purposes as the invention extends beyond these limited embodiments.

FIGS. 1-7 show various views of the computing device in accordance with various embodiments. FIG. 1 shows a front facing perspective view of an embodiment of the computing device in the form of a computing device 100 in an open (lid)

state. In some embodiments, the computing device 100 can be portable. The computing device 100 can include base portion 102 formed of bottom case 104 fastened to top case 106. Together, bottom case 104 and top case 106 define a housing 140 that defines an interior cavity in which various electronic components of the computing device 100 are housed. Housing 140 can include a bottom wall (not visible in FIG. 1), a top wall 142 opposite the bottom wall, and a sidewall 144 extending between the bottom and top walls around a periphery of base portion 102.

Base portion 102 can be pivotally connected to lid portion 108 by way of clutch assembly 110 hidden from view by a cosmetic wall. Base portion 102 can have an overall uniform shape sized to accommodate clutch assembly 110 and inset portion 112 suitable for assisting a user in lifting lid 108 by, for example, a finger. Top case 106 can be configured to accommodate various user input devices such as keyboard 114 and touch pad 116. Keyboard 114 can include a plurality of low profile keycap assemblies arranged in a one or more rows with each assembly having an associated keycap 118. Each keycap 118 can extend through an opening or aperture in top wall 142 of housing 140 and be connected to a printed circuit board within housing 140. A small gap can extend around the perimeter of each keycap 118 between the keycap and housing 140 as discussed in more detail in FIGS. 2A and 2B. In one embodiment, an audio transducer (not shown) can use selected portions of keyboard 114 to output audio signals such as music. In the described embodiment, one or more microphones can be located at a side portion of top case 106 away from keyboard 114 at locations spaced apart from other microphones to improve frequency response of an associated audio circuit.

Each of the plurality of key caps 118 can have a symbol imprinted thereon for identifying the key input associated with the particular key pad. Keyboard 114 can be arranged to receive a discrete input at each keypad using a finger motion referred to as a keystroke. In the described embodiment, the symbols on each key pad can be laser etched thereby creating an extremely clean and durable imprint that will not fade under the constant application of keystrokes over the life of the computing device 100. In order to reduce component count, a keycap assembly can be re-provisioned as a power button. For example, key pad 118-1 can be used as a power button. In this way, the overall number of components in the computing device 100 can be commensurably reduced.

Touch pad 116 can be configured to receive finger gesturing. A finger gesture can include touch events from more than one finger applied in unison. The gesture can also include a single finger touch event such as a swipe or a tap. The gesture can be sensed by a sensing circuit in touch pad 116 and converted to electrical signals that are passed to a processing unit for evaluation. In this way, the computing device 100 can be at least partially controlled by touch.

Lid portion 108 can be moved with the aid of clutch assembly 110 from the closed position to remain in the open position and back again. Lid portion 108 can include display 120 and rear cover 122 (shown more clearly in FIG. 2) that can add a cosmetic finish to lid portion 108 and also provide structural support to at least display 120. In the described embodiment, lid portion 108 can include mask (also referred to as display trim) 124 that surrounds display 120. Display trim 124 can be formed of an opaque material such as ink deposited on top of or within a protective layer of display 120. Display trim 124 can enhance the overall appearance of display 120 by hiding operational and structural components as well as focusing attention onto the active area of display 120.

Display 120 can display visual content such as a graphical user interface, still images such as photos as well as video media items such as movies. Display 120 can display images using any appropriate technology such as a liquid crystal display (LCD), Organic Light Emitting Diode (OLED), etc. The computing device 100 can also include image capture device 126 located on a transparent portion of display trim 124. Image capture device 126 can be configured to capture both still and video images. Lid portion 108 can be formed to have uni-body construction that can provide additional strength and resiliency to lid portion 108 which is particularly important due to the stresses caused by repeated opening and closing. In addition to the increase in strength and resiliency, the uni-body construction of lid portion 108 can reduce overall part count by eliminating separate support features.

Data ports 128-132 can be used to transfer data and/or power between an external circuit(s) and computing device 100. Data ports 128, 130, and 132 can include, for example, input slot 128 that can be used to accept a memory card (such as a FLASH memory card), data ports 130 and 132 can take be used to accommodate data connections such as Universal Serial Bus (USB), FireWire, Thunderbolt, and so on. In some embodiments, speaker grids 134 disposed on opposite sides of keyboard 114 can be used to port audio from an associated audio component enclosed within base portion 102. In one embodiment, microphones for capturing audio can be located in microphone region 136. Although not shown in FIG. 1, in other embodiments, microphones for capturing audio can be located in region 138 or in other portions of housing 140 or lid 108.

Figure 2A:
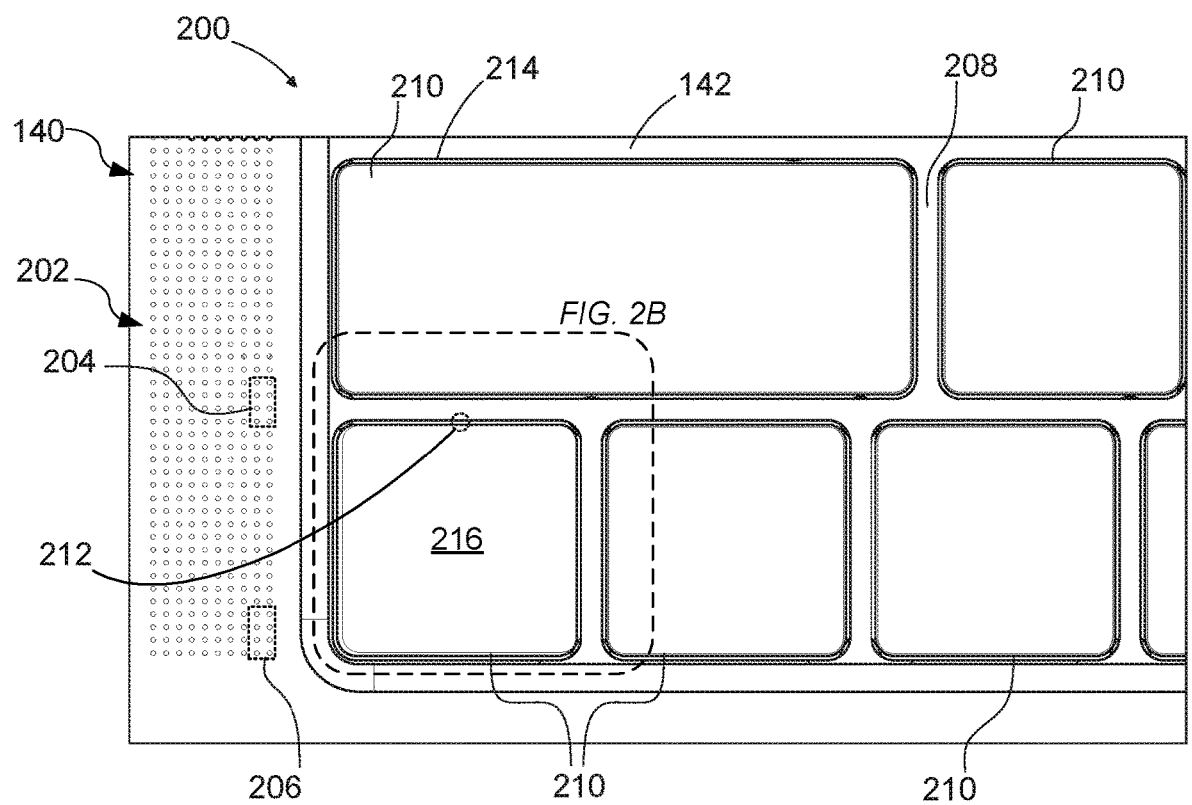
FIG. 2A is a detailed view of a portion of the top case of the computing device shown in FIG. 1.

FIG. 2A is a detailed view of a portion 200 of the top case of the computing device 100 shown in FIG. 1. The portion 200 of the case shows a perforated region 202 of the top case that, in some embodiments, can correspond to the microphone region 136 shown in FIG. 1. The perforated region 202 allows for sound to project from one or more speakers installed underneath the perforated region 202. In addition, the perforations allow for sound to pass through into the case to be received by one or more microphones inside the case of the computing device (e.g., microphones located in microphone region 136). In various embodiments, a first microphone 204 can be affixed beneath perforated region 202 in a first position on a structural support element disposed within housing 140. In various embodiments, a second microphone 206 can be affixed beneath perforated region 202 in a second position on the structural support element within housing 140. In some embodiments, microphones 204 and 206 can each be spaced away from the keyboard region of device 100 and optimized to pick up near-field audio, such as voice signals generated by a user of device 100 while the user is actively using device 100.

FIG. 2A further depicts a keyboard webbing 208 between a plurality of keys 210. Webbing 208 includes multiple apertures 214 formed through top wall 142 at an upper surface of housing 140. In some embodiments, webbing 208 includes a separate aperture 214 for each individual key 210, and each key 210 includes a keycap 216 that is coupled to a keyboard circuit board (not shown in FIG. 2A) disposed within housing 140 beneath the keyboard. Each aperture 214 in webbing 208 can have a shape that resembles but is slightly larger than that of its respective keycap 216 that extends through the aperture 214 in webbing 208 forming a slight gap 220 between each keycap and a perimeter of its respective aperture 214 as shown more clearly in FIG. 2B, which is an expanded view of the bottom left keycap 216 depicted in FIG. 2A. Gap 220 enables the keycap 216 to be depressed by a user towards the keyboard circuit board without being impeded by webbing 208. The width (W) of gap 220 (i.e., the distance between the edge of keycap 216 and the edge of aperture 214) can be determined based on reasonable manufacturing tolerances to ensure each keycap 216 fits within its respective aperture 214. Gap 220 can be generally quite narrow (e.g., less than 1.5 mm in some embodiments and less than 1 mm in other embodiments).

Figure 2B:
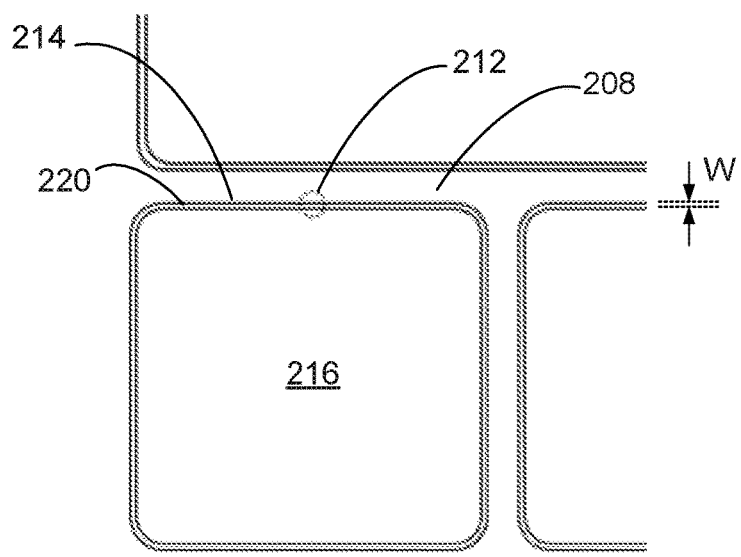
FIG. 2B is an expanded view of the portion of the top case in the region surrounding the bottom left keycap depicted in FIG. 2A.

In various embodiments, a third microphone can be included in device 100 within bottom case 104 beneath keyboard 114. As shown in FIGS. 2A and 2B, an audio channel 212 (represented in dashed lines) can be formed through gap 220 between the keycap and the keyboard webbing 208. For example, in some embodiments audio channel 212 can extend from the third microphone (not shown in FIG. 2A or 2B), through an aperture in the keyboard circuit board (also not shown in FIG. 2A or 2B) and through gap 220. Since the audio channel uses gap 220 as the exit of the channel from housing 104, audio channel 220 can be completely hidden from the user resulting in an aesthetically pleasing appearance while enabling the microphone to capture audio from the surrounding environment.

In some embodiments, the third microphone can be optimized to pick-up far-field (e.g., greater than 3 meters) audio that thus enables a user to activate a digital voice assistant mode of device 100 or use device 100 for video conferencing while the user is many feet away (e.g., across a room) from device 100. In such applications, a user is less likely to be actively typing on the keyboard and thus noise associated with such typing is unlikely to be an issue.

Figure 3:
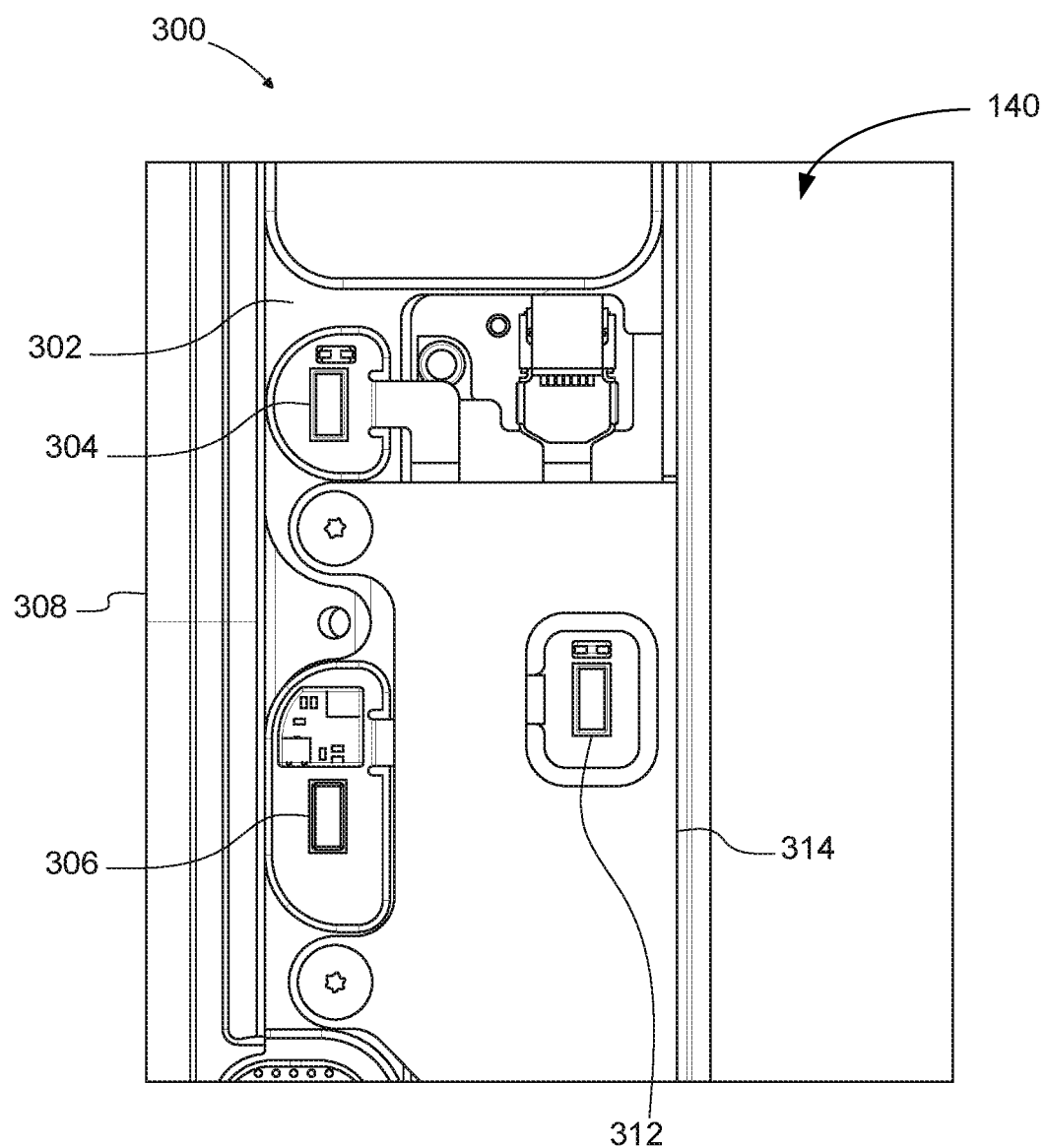
FIG. 3 shows an internal view of the top case in the region of the microphone and the battery tray.

FIG. 3 shows an internal view 300 of a portion of housing 140 in the region of the microphone and a battery tray. In various embodiments, a first microphone 304 can be affixed in a first position on a structural support element 302 within housing 140. In various embodiments, a second microphone 306 can be affixed in a second position on the structural support element 302 within housing 140. The structural support element 302 can be attached to the bottom case 308. In various embodiments, a third microphone 312 can be attached to a printed circuit board in a recess in the battery tray 314. Microphones 304 and 306 can be representative of microphones 204, 206 discussed in FIG. 2A and microphone 312 can be representative of the third microphone discussed above without a reference number. Thus, in some embodiments microphones 304 and 306 can be located beneath speaker grid 136 while microphone 312 can be located beneath keyboard 114 as shown in FIG. 1.

Microphones 304, 306 and 312 can be part of a three microphone array arranged in a triangular pattern and optimized to pick up both near and far field audio. The microphone array can employ beamforming to improve reception of sound received at the microphone array, especially from far field (e.g., greater than 3 meters) distances. Employing a three microphone array within computing device 100 can reduce the word error rate from far field sources over traditional two microphone designs. Beamforming improves sound reception by combining elements in a microphone array in such a way that sound waves at particular angles experience constructive interference while others experience destructive interference. The ideal conditions for beamforming is to arrange the microphone array in an equilateral triangle. Due to space limitations and geometric restrictions that may be present in various computing devices, a perfect equilateral triangle arrangement may not always be possible. For example, in the embodiment depicted in FIG. 3, the microphone array is arranged in a nearly equilateral triangle arrangement with exemplary distances of 14.7 cm, 16 cm, and 19.6 cm between the respective microphones.

Figure 4:
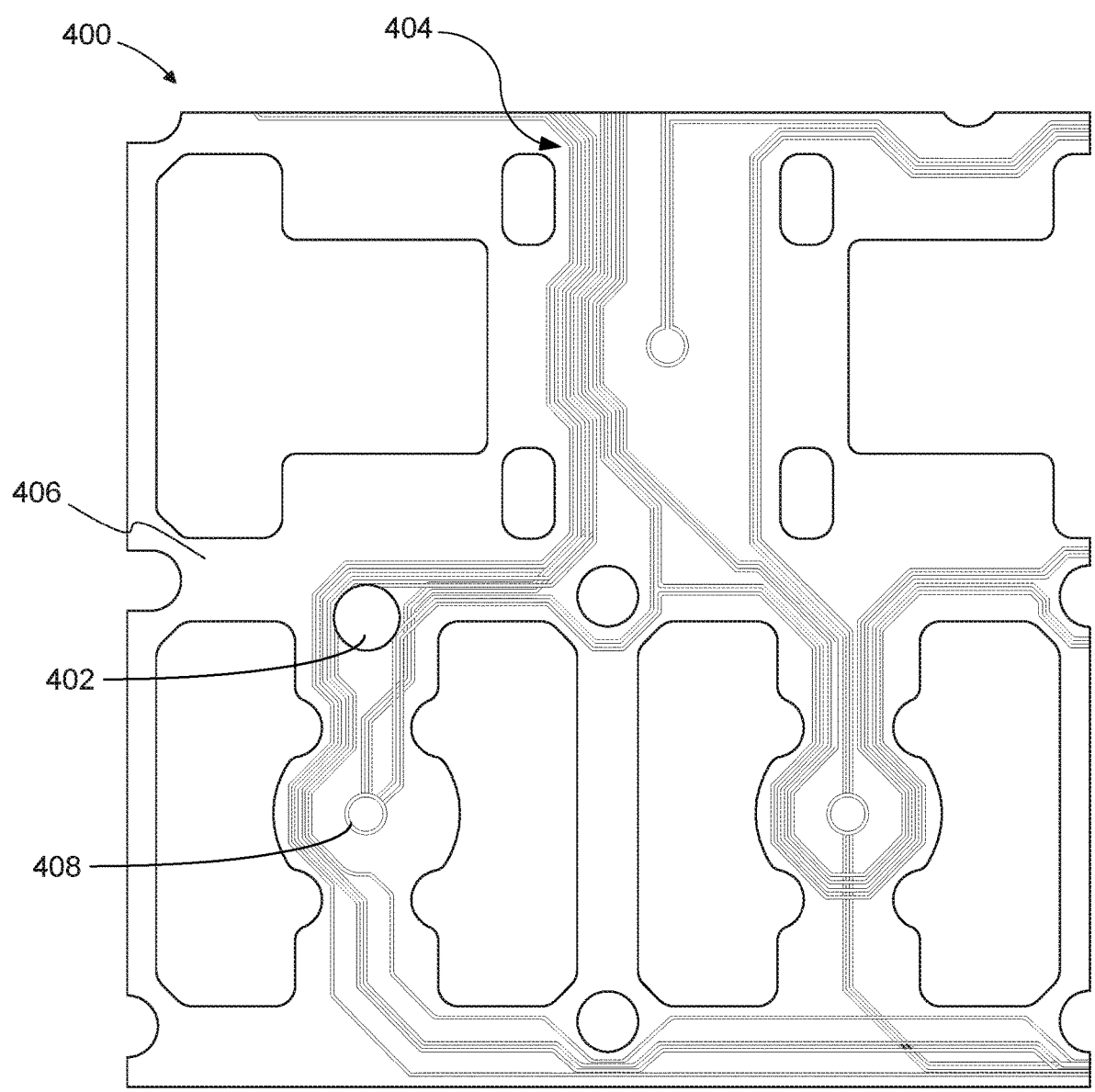
FIG. 4 is an illustration of an exemplary keyboard printed circuit board according to some embodiments of the disclosure.

FIG. 4 is an illustration of an exemplary keyboard printed circuit board 400 that can be included within housing 140, shown in FIG. 1, beneath keyboard 114, shown in FIG. 1, according to some embodiments. The printed circuit board 400 can have a upper surface (not visible in FIG. 4) and a lower surface 406. In some embodiments, a microphone (not shown in FIG. 4), such as third microphone 312, shown in FIG. 3, can be affixed to the lower surface 406 of the printed circuit board 400 as discussed below with respect to FIG. 5. The printed circuit board 400 can have a plurality of line tracings 404 to carry one or more electrical signals between various electronic components attached to the printed circuit board 400. For example, line tracings 404 can carry signals indicating an individual key attached to circuit board 400 at attachment locations 408 was activated (i.e., depressed). In some embodiments, the printed circuit board 400 can have one or more apertures formed through the printed circuit board 400 to access various components. In some embodiments, the printed circuit board 400 can have an aperture 402 through the printed circuit board that is part of audio channel 212 discussed above and shown in FIG. 2A. In some embodiments, a microphone, such as third microphone 312, can be affixed to the lower surface 406 of the printed circuit board 400 over the aperture 402 and operatively coupled to receive audio through channel 212 via aperture 402.

Figure 5:
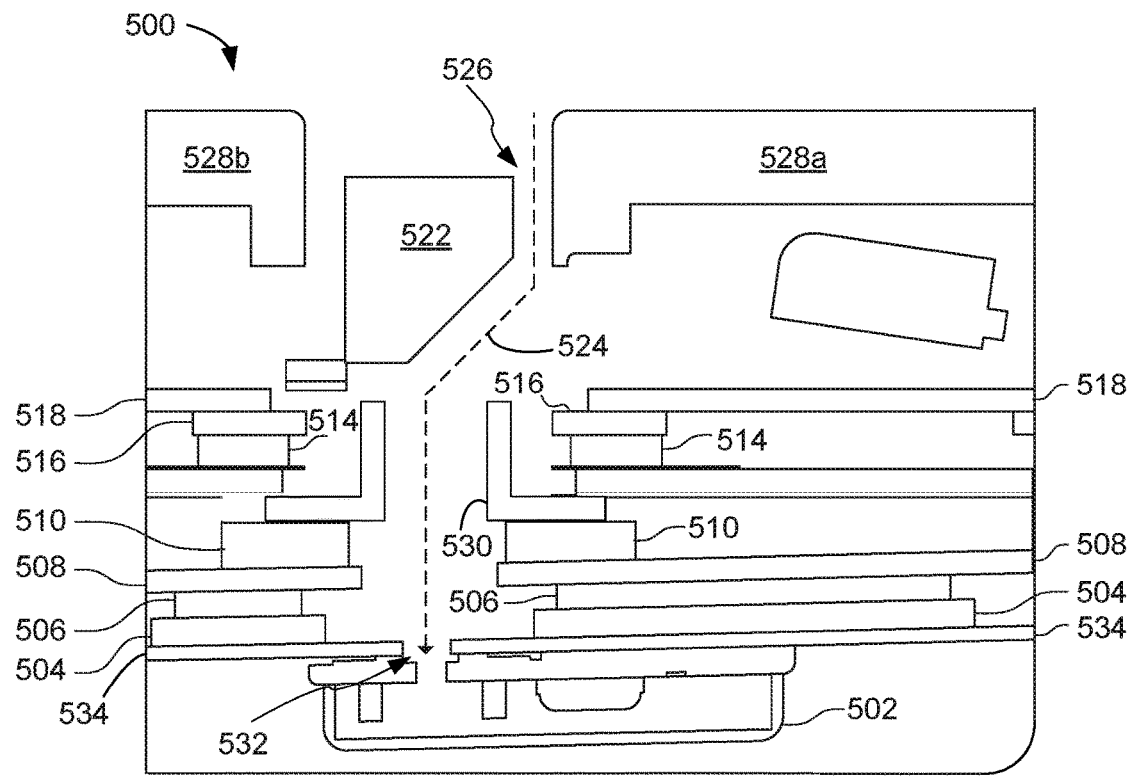
FIG. 5 is an internal view of a microphone channel in accordance with some embodiments of a computing device according to the disclosure.

FIG. 5 is an internal view of a portion 500 of a computing device, such as a portion of base portion 104 of computing device 100, shown in FIG. 1, that includes an audio channel 524 that extends from an audio entrance at a gap 526 formed between a first keycap 528a and a webbing 522 to a microphone 502 according to an embodiment of the disclosure. The audio channel can be defined by one or more components of the base portion as described herein. Keycap 528a can be representative of keycap 216 shown in FIGS. 2A and 2B while webbing 522 can be representative of webbing 208.

As shown in FIG. 5, microphone 502 is disposed within a housing of device 100 and attached to a support element, such as stiffener 504. The stiffener 504 can be affixed via adhesive 506 to the battery tray 508 or a different component of the computing device. In various embodiments, a foam layer 510, one or more spacer(s) 514, feature plates 516, electrical membrane 518 and one or more other elements together form an audio channel 524 between the layers to allow sound to travel from gap 526 between the keyboard webbing 522 and a first keycap 528a to microphone 502. The channel 524 continues between the layers through an aperture 532 in the microphone in the microphone flex plate 534. The aperture 532 can represent the aperture 402 depicted in FIG. 4. The foam 510 seals the microphone 502 to the keyboard. Also shown in FIG. 5 is a second keycap 528b, adjacent to keycap 528a. In some embodiments, the channel 524 can incorporate a T-shaped snorkel 530 to both form the channel through the multiple layers of the keyboard architecture. The snorkel 530 can also provide a consistent cross section for longer distances for consistency. Some or all of the various components described above, and/or other components within the base portion, can combine to form audio channel 524. For example, as depicted in FIG. 5, audio channel 524 can be defined by keycap 528a, webbing 522, membrane 518, snorkel 530, foam layer 510, battery tray 508, adhesive 506, stiffener 504 and flex plate 534 all combine in one manner or another to at least partially define the audio channel.

Figure 6:
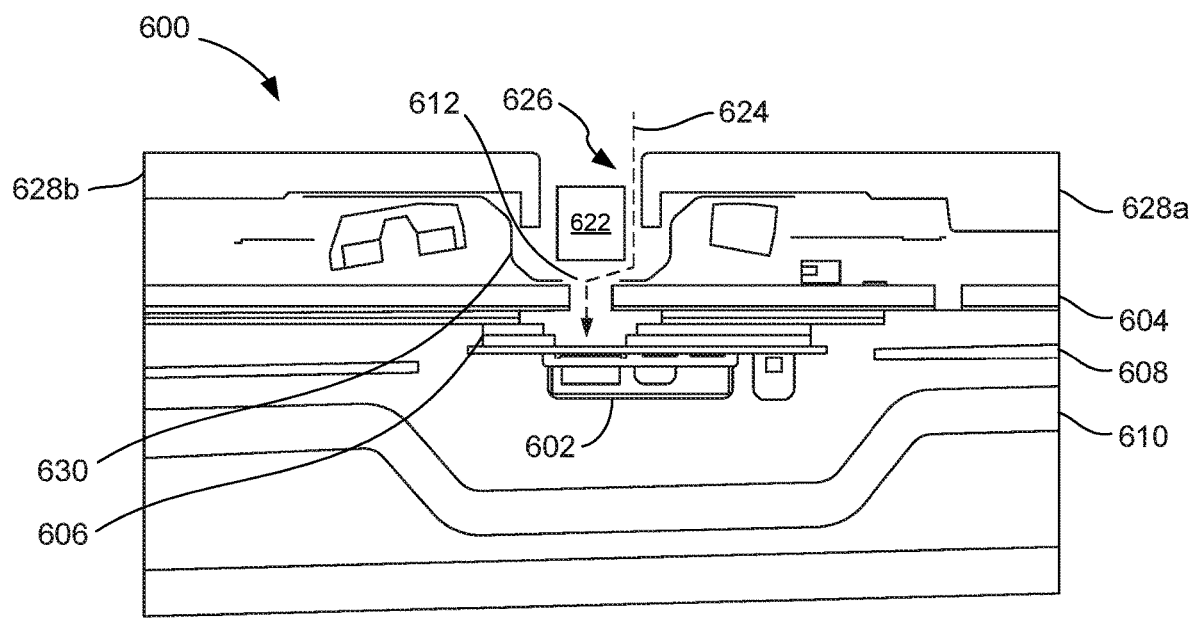
FIG. 6 is an internal view of a microphone channel in accordance with some embodiments of a computing device according to the disclosure.

FIG. 6 is an internal view of a portion 600 of a computing device, such as a portion of base portion 104 of computing device 100, that includes an audio channel 624 according to another embodiment of disclosure. As shown in FIG. 6, a microphone 602 is affixed to a support element, such as printed circuit board 604, within a housing of device 100. In some embodiments, the microphone 602 is affixed to printed circuit board 604 via an adhesive 606. In various embodiments, the microphone 602 is mounted in a recess of a battery tray 608. In some embodiments, the microphone 602 is installed between a speaker 610 and the keyboard. Various components of the base portion can define audio channel 624 such that it extends from gap 626 between keyboard webbing 622 and a keycap 628a to microphone 602 and through aperture or opening 612 that can correspond to opening 402 discussed above with respect to FIG. 4. In some embodiments, a silicon barrier 630 can be affixed between the top surface of the printed circuit board 604 and the back of the keycaps 628. The silicon barrier 630 can improve the channeling of sound to the microphone 602 providing an improved path for sound to the microphone and creating a sound path that would does not capture undesirable noises such as might be generated by an internal computer fan or other component. Alternate keyboard architectures are possible such as printed circuit board (PCB) based keyboards employed on some portable computing devices and metal feature plate keyboards that are employed by other portable computing devices and desktop keyboards.

In the embodiment shown in FIG. 6, placing microphone 602 in front of the speaker results in improved performance over placing the microphone behind the speaker. In some embodiments, microphone 602 can be used for beam forming with the beam forming done in such a manner as to nullify audio coming from behind the microphone (e.g., where the speaker is located) and emphasizing audio coming from in front of the microphone. As long as the microphone is in front of the speaker, the microphone can send a null back at the echoing speaker feedback path, which is desirable. Embodiments of the disclosure can use beam forming to listen to the user and filter out speaker from the computing device.

Figure 7:
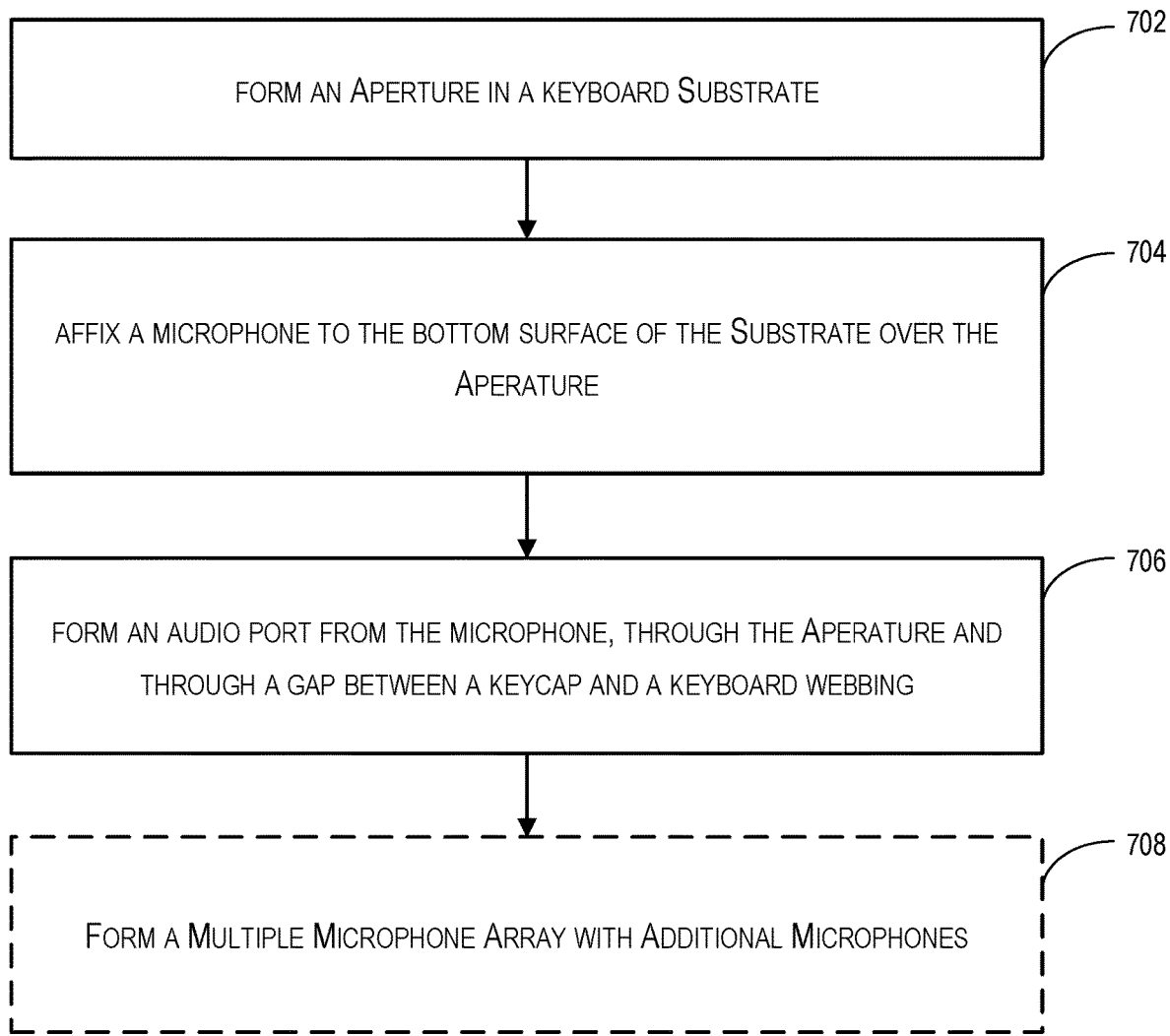
FIG. 7 illustrates an exemplary flow diagram for forming an audio channel for a microphone through a keyboard of a computing device according to some embodiments of the disclosure.

FIG. 7 illustrates an exemplary flow diagram for porting a microphone through a keyboard of a computing device. At 702, the method can include forming an aperture in a keyboard substrate. The keyboard substrate can comprise a bottom surface and a top surface. In some embodiments, the keyboard substrate can comprise a printed circuit board (PCB). The aperture can be any one of several standard shapes such as circular, oval, rectangular, or square. The aperture can be formed through any one of known techniques including drilling, cutting, laser drilling, or etching.

At 704, the method includes affixing a microphone to the bottom surface of the keyboard substrate so that the microphone is over the aperture. In some embodiments, the microphone can completely cover the aperture. In some embodiments, the affixing can be accomplished using adhesive. In some embodiments, the adhesive can be pressure sensitive adhesive. In some embodiments, the microphone can be soldered onto the substrate.

At 706, the method includes forming a microphone port from the aperture in the keyboard substrate through a gap between a keycap and a keyboard webbing. In some embodiments the gap can be formed on multiple sides of a keycap. In some embodiments, the gap can be formed due to alignment of the keys and the webbing. In some embodiments, the gap can be formed by drilling. In some embodiments, the microphone port can channel far field sound to the microphone.

At 708, the method can optionally include affixing a pair of microphones to a support structure underneath perforations in a top case of the computing device, forming a multiple-microphone array. In some embodiments, the multiple-microphone array can comprise three microphones. In some embodiments, a three-microphone array can be formed in a triangular configuration. In some embodiments, the triangular configuration can have nearly equal distances.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing invention has been described in detail by way of illustration and example for purposes of clarity and understanding, it will be recognized that the above described invention may be embodied in numerous other specific variations and embodiments without departing from the spirit or essential characteristics of the invention. For example, while the embodiments discussed above with respect to FIGS. 1-6 included three separate microphones that are part of a microphone array, other embodiments of the disclosure can include a single microphone. Some embodiments can comprise a dual microphone array with a first microphone located underneath the keyboard in a first location and a second microphone located underneath the webbing in a second region/portion of device 100. In some embodiments, the second and third microphones can be located under a touch bar located above the keyboard. In some embodiments, the second and third microphones can be located underneath the keyboard with one or more microphone ports located in the one or more side(s) or front of the housing. Additionally, in some embodiments an audio channel to a microphone under a keyboard can extend from the microphone through more than a single gap between a keycap and the keyboard webbing. For example, in some embodiments the audio channel to the microphone can extend through gaps on opposing sides of a single keycap and in other embodiments the audio channel can extend through a first gap between a first keycap and the webbing and through a second gap between a second keycap and the webbing.

Additionally, spatially relative terms, such as "bottom" or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

What is claimed is:

1. A computing device, comprising:
a base portion comprising a keyboard including a plurality of keycaps protruding out of a plurality of openings in a top surface of the base portion and a microphone support element having an aperture formed between upper and lower surfaces;
a first microphone disposed within the base portion beneath the keyboard, coupled to a lower surface of the microphone support element and aligned over the aperture;
one or more internal components, including at least one of a foam layer, one or more spacers, a feature plate, and an electrical membrane, disposed in the base portion and defining an audio channel extending from the first microphone through the aperture of the microphone support element to a gap formed between a keycap in the plurality of keycaps and a sidewall surface of an opening in the plurality of openings in the top surface of the base portion; and
a second microphone and a third microphone, wherein each of the second and the third microphone installed underneath perforations in the top surface of the base portion of the computing device form a three-microphone array arranged in a triangular configuration.

2. The computing device of claim 1, wherein the triangular configuration is equilateral.

3. The computing device of claim 1, wherein the microphone support element comprises a printed circuit board.

4. The computing device of claim 1 further comprising a lid portion pivotally coupled to the base portion.

5. The computing device of claim 4 further comprising a display within the lid portion.

6. The computing device of claim 1 further comprising a silicon barrier between the keycap and the microphone support element.

7. The computing device of claim 1 wherein the one or more internal components include a battery tray.

8. The computing device of claim 7 wherein the one or more internal components include a spacer and a layer of foam.

9. A computing device comprising:
a housing having a first exterior surface defining a plurality of openings and a second exterior surface opposite the first exterior surface;
a keyboard including a keyboard substrate disposed within the housing and a plurality of keycaps attached to the keyboard substrate, wherein the keyboard substrate includes an aperture formed through the keyboard substrate and wherein each individual keycap in the plurality of keycaps protrudes through and fills a majority of a respective opening in the plurality of openings;
a first microphone disposed within the housing between the first and second exterior surfaces;
one or more internal components disposed in the housing and defining an audio channel extending from the first microphone through the aperture and through a gap between one of the plurality of keycaps and its respective opening in the plurality of openings; and
second and third microphones disposed within the housing in an area spaced apart from the keyboard, wherein the first microphone is optimized to receive far field audio and the second and third microphones are optimized to receive near field audio.

10. The computing device of claim 9 wherein the plurality of openings in the first exterior surface are spaced in one or more rows.

11. The computing device of claim 9 wherein the one or more internal components include a battery tray.

12. The computing device of claim 11 wherein the one or more internal components include a spacer and a layer of foam.

13. A computing device comprising:
a housing having a first exterior surface defining a plurality of openings spaced in one or more rows and a second exterior surface opposite the first exterior surface;
a keyboard including a keyboard circuit board disposed within the housing and a plurality of keycaps attached to the keyboard circuit board, wherein the keyboard circuit board includes an aperture formed through the keyboard circuit board and wherein each individual keycap in the plurality of keycaps protrudes through and fills a majority of a respective opening in the plurality of openings;
first and second microphones disposed within the housing in an area spaced apart from the keyboard;
a third microphone disposed within the housing between the keyboard circuit board and second exterior surface;
a silicon barrier between a keycap of the plurality of keycaps and the keyboard circuit board, the silicon barrier having an aperture aligned with the aperture of the keyboard circuit board; and
one or more internal components disposed in a base portion of the housing and defining an audio channel extending from the third microphone through the aperture and through a gap between one of the plurality of keycaps and its respective opening in the plurality of openings.

14. The computing device of claim 13 the first, second and third microphones are part of a three-microphone array arranged in a triangular pattern.

15. The computing device of claim 13 further comprising a lid portion pivotally coupled to the base portion.

16. The computing device of claim 15 further comprising a display within the lid portion.

* * * * *